United States Patent [19]
Kaecker

[11] Patent Number: 5,092,073
[45] Date of Patent: Mar. 3, 1992

[54] FISHING JIG

[76] Inventor: Eugene W. Kaecker, 331 Eakle Rd., Harmon, Ill. 61042

[21] Appl. No.: 646,074

[22] Filed: Jan. 25, 1991

[51] Int. Cl.⁵ .......................................... A01K 85/00
[52] U.S. Cl. ................................. 43/42.39; 43/42.45
[58] Field of Search ............... 43/42.39, 42.45, 42.11, 43/42.13

[56]     References Cited
       U.S. PATENT DOCUMENTS

| | | | |
|---|---|---|---|
| D. 202,112 | 8/1965 | Storm | 43/42.45 |
| D. 216,882 | 3/1970 | Clink | 43/42.39 |
| 549,842 | 11/1895 | Cable | 43/42.39 |
| 3,212,209 | 10/1965 | Irving | 43/42.45 |
| 4,450,645 | 5/1984 | Ancowa | 43/42.39 |
| 4,713,907 | 12/1987 | Dudeck | 43/42.39 |
| 4,926,577 | 5/1990 | Radtchenko | 43/42.45 |

Primary Examiner—Kurt Rowan
Attorney, Agent, or Firm—Leydig, Voit & Mayer

[57]            ABSTRACT

A fishing jig having a cast metal head formed with a bulbous rear portion and an elongated forwardly extending nose portion whose laterally facing sides are formed with concave depressions. The shape of the head causes it to shed weeds as the jig is pulled forwardly in the water. In one embodiment, the depressions define laterally and upwardly facing surfaces which scoop through the water and tend to force the jig downwardly as the jig is retrieved. In a second embodiment, the surfaces defined by the depressions face laterally and downwardly and cause the jig to tend to rise during retrieval of the jig.

4 Claims, 1 Drawing Sheet

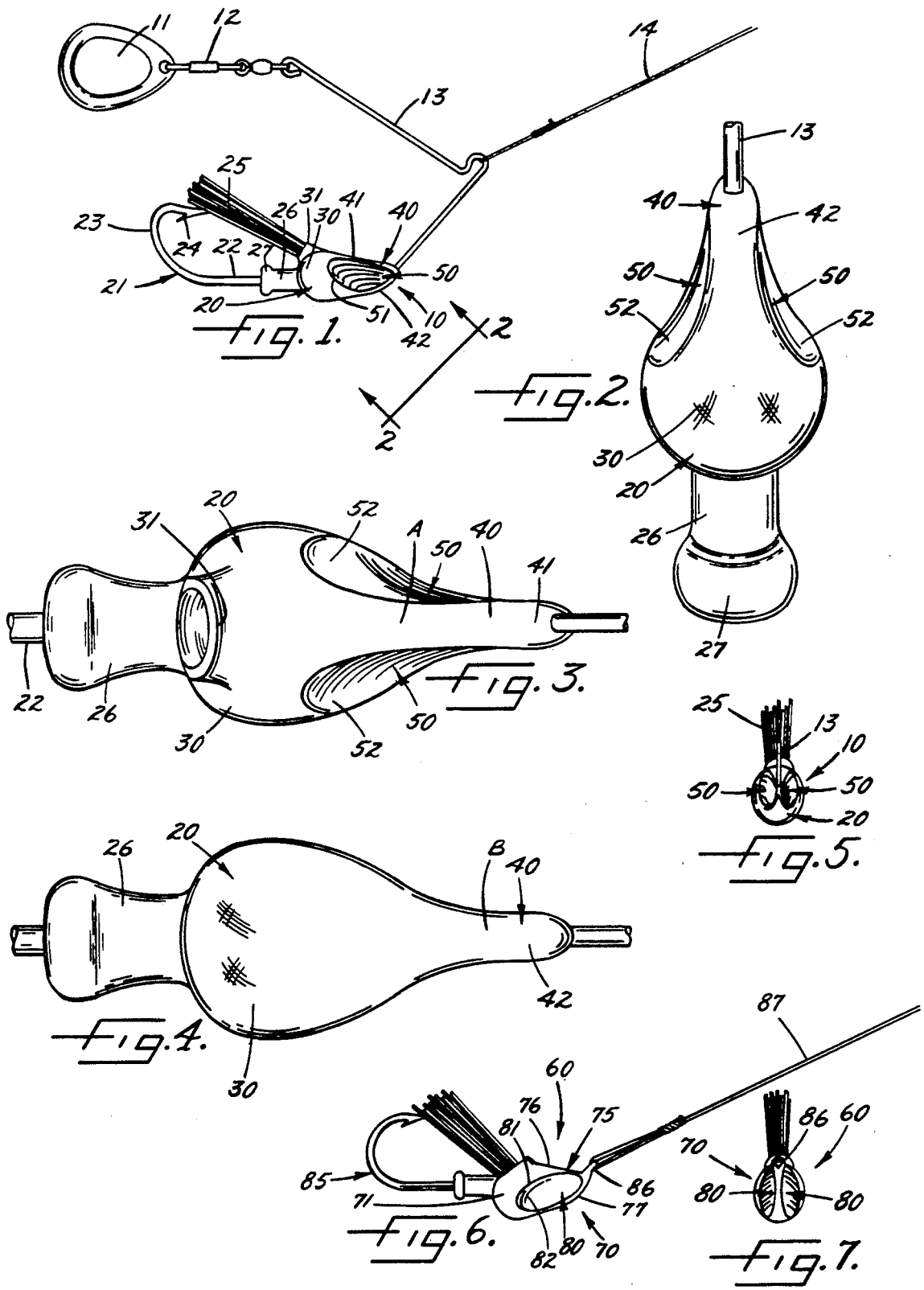

FISHING JIG

BACKGROUND OF THE INVENTION

This invention relates to a fishing jig of the type having a hook and having a weighted head attached to the forward end of the shank of the hook. A fishing line is adapted to be attached to the front of the head and pulls the jig forwardly through the water when the line is retrieved.

Certain species of fish tend to feed on the bottom of a body of water and in areas which have a heavy growth of weeds and other vegetation. It is desirable to cause a jig to ride close to the bottom but problems are encountered as a result of the lure snagging on the weeds. Weedless hooks alleviate the problem somewhat but do not overcome the tendency of the head of the jig to become snagged.

SUMMARY OF THE INVENTION

One aim of the present invention is to provide a new and improved jig whose head is uniquely shaped so as to cause the head to shed weeds as the jig is pulled through the water, the jig thereby being virtually weed-free.

Another object of the invention is to provide a jig having a head which causes the jig to tend to move with a vertical component as the jig is pulled forwardly. In one embodiment, the shape of the head causes the head to be drawn downwardly toward the bottom as the jig is retrieved. In a second embodiment, the head is shaped to cause the jig to tend to rise upwardly during retrieval.

In a more detailed sense, the invention resides in the provision of a jig head having a bulbous rear portion, an elongated and forwardly tapered nose portion which causes the head to shed weeds, and generally spoon-shaped depressions formed in the sides of the nose portion and causing the water to exert a vertical force component on the jig as the jig is retrieved.

These and other objects and advantages of the invention will become more apparent from the following detailed description when taken in conjunction with the accompanying drawings.

BRIEF DESCRIPTION OF THE DRAWINGS

FIG. 1 is a side elevational view of one embodiment of a new and improved jig incorporating the unique features of the present invention, the jig being shown as forming part of a spinner bait.

FIG. 2 is an enlarged view of the head of the jig as seen along the line 2—2 of FIG. 1.

FIG. 3 is an enlarged top plan view of the head shown in FIG. 1.

FIG. 4 is an enlarged bottom plan view of the head shown in FIG. 1.

FIG. 5 is a front elevational view of the jig shown in FIG. 1.

FIG. 6 is a side elevational view of a second embodiment of a jig incorporating the features of the invention.

FIG. 7 is a front elevational view of the lure shown in FIG. 6.

DETAILED DESCRIPTION OF THE PREFERRED EMBODIMENTS

As shown in the drawings for purposes of illustration, the invention is embodied in an artificial fishing lure 10 and, more particularly, in a lure of the type which is conventionally referred to as being a jig. In the present instance, the jig 10 has been shown as forming part of a spinner-type bait having a spinner 11 attached to a swivel 12 which, in turn, is attached to the upper end of a bridle 13. A fishing line 14 is connected to the bridle between its ends while the lower end of the bridle is connected to the forward end of the jig 10.

The jig 10 includes a head 20 which preferably is cast from lead or other heavy material so as to cause the jig to sink. A hook 21 with an elongated shank 22 is secured to and extends rearwardly from the head and, in this instance, includes an upwardly and forwardly curved section 23 having a barb 24 at its upper end. The barb and the forward point of the hook are shielded by a conventional bristle-type weed guard 25. The forward end portion of the shank 22 extends into and is encircled by a cylindrical sleeve 26 which is integral with the rear end of the head 20. If desired, the forward end portion of a fringed skirt (not shown) may be telescoped over and contracted around the sleeve and held thereon by an enlarged collar 27 on the rear of the sleeve.

According to the present invention, the head 20 of the jig 10 is uniquely shaped so as to cause the head to shed weeds and to tend to move vertically when the line 14 is retrieved and pulls the jig forwardly through the water. In one embodiment, the shape of the head causes the jig to tend to move downwardly and to run along the bottom. In an alternate embodiment, the head is shaped so as to cause the jig to tend to rise in the water during retrieval.

The jig 10 which tends to draw downwardly is illustrated in FIGS. 1 to 5. As shown, the head 20 is formed with a bulbous and generally hemispherical rear end portion 30 which is located just ahead of and is formed integrally with the sleeve 26, the sleeve being substantially centered with respect to the hemispherical portion. An upwardly and rearwardly opening sleeve or socket 31 may be formed in the upper side of the hemispherical portion 30 to telescopically receive the weed guard 25.

Projecting forwardly from the hemispherical portion 30 is an elongated nose portion 40 whose forward end is attached to the bridle 13. The nose 40 includes a top 41 (FIGS. 2 and 3), a bottom 42 (FIG. 4) and two laterally facing sides. As shown in FIG. 3, the top 41 of the nose 40 is relatively narrow in lateral width at the front of the head and has substantially less width than the hemispherical portion 30. As the top 41 of the nose 40 proceeds from front-to-rear, it remains of narrow and generally constant width for a substantial distance. At a point indicated by the reference letter A, the top 41 of the nose 40 gradually begins to widen as the nose progresses rearwardly and then the top blends smoothly into the upper side of the hemispherical portion 30 in such a manner that there is no detectable break between the top of the nose and the upper side of the hemispherical portion. The top 41 of the nose 40 is substantially straight in the longitudinal direction and slopes downwardly at an angle of about 15 degrees relative to horizontal as it proceeds from rear-to-front. In the lateral direction, the top 41 of the nose 40 is convexly radiused to cause the top to form a smooth continuation of the hemispherical portion in the lateral direction.

The bottom 42 of the nose 40 is shown in FIG. 4 and, at its forward end, has approximately the same narrow lateral width as the top 41 of the nose. The bottom of the nose, however, is of short narrow width for only a relatively short distance as it proceeds rearwardly and, upon reaching a point B. begins to widen significantly and to merge into the hemispherical portion 30. The bottom 42 of the nose 40, therefore, blends into the hemispherical portion 30 more nearly toward the front of the head 20 than does the top 41 of the nose and, as a result, the nose is more pronounced when viewed from the top than from the bottom.

As shown in FIG. 1, the rear portion of the bottom 42 of the nose 40 is substantially straight in a longitudinal direction for a short length adjacent the hemispherical portion 30 but, as the bottom of the nose proceeds forwardly, it curves convexly and upwardly to meet the top 41 of the nose at the point where the bridle 13 is attached. Like the top 41 of the nose 40, the bottom 42 of the nose is radiused convexly in the lateral direction to establish a smooth lateral blend with the hemispherical portion 30.

Pursuant to the invention, each of the lateral sides of the nose 40 is formed with a concave depression 50. Each depression is generally spoon-shaped and is concavely cupped both longitudinally and vertically at least adjacent the hemispherical portion 30. As each depression proceeds forwardly, the concavity in both directions decreases until each lateral side of the head 20 is virtually flat and planar at the extreme forward end of the nose 40.

In the embodiment illustrated in FIGS. 1 to 5, the lower rear margin 51 of each depression 50 curves sharply upwardly as shown in FIG. 1 and, as a result, leaves a very pronounced upwardly and laterally facing surface 52 (FIG. 3) near the hemispherical portion 30. As the jig 10 is pulled forwardly, the reaction of the water against the pronounced upwardly facing surfaces 52 tends to force the jig downwardly to cause the jig to ride near the bottom of the body of water. The streamlined shape of the head 20, with the nose 40 gradually blending into the hemispherical portion 30, causes the jig to shed weeds and other vegetation and thereby avoid snags. The shape of the head makes the jig virtually weed-free when the jig is equipped with a weedless hook. Also, the shape of the head causes the jig to ride straight in the water without rolling or canting.

A modified jig 60 is shown in FIGS. 6 and 7 and is similar to the jig 10 except that the head 70 of the jig 60 is shaped to cause the jig 60 to tend to rise in the water as the jig is retrieved. As in the case of the jig 10, the head 70 of the jig 60 is formed with a rear bulbous or generally hemispherical portion 71. The head 70 of the jig 60 also is formed with a nose 75 having a top 76 which, in elevational view, is essentially the same as the top 41 of the nose 40 of the jig 10 but which, in plan view, is shaped essentially the same as the bottom 42 of the nose 40. Similarly, the bottom 77 of the nose 75 of the jig 60 is essentially the same in elevational view as the bottom 42 of the nose 40 while the bottom 77 is essentially the same in plan view as the top 41 of the nose 40.

A depression 80 is formed in each lateral side of the nose 75 and, in effect, is a vertically inverted version of the depression 50 of the nose 40. Thus, each depression includes an upper rear margin 81 which curves sharply downwardly so as to leave a pronounced downwardly and laterally facing surface 82 near the hemispherical portion 71. For all practical purposes, therefore, FIG. 3 is also a representation of the bottom side of the nose 75 of the jig 60 while FIG. 4 is a representation of the top side of the nose 75.

The hook 85 of the jig 60 includes an upwardly inclined eye 86 at the forward end of the head 70 and serving as an attachment point for a fishing line 87. When the jig is pulled forwardly, water acting against the pronounced downwardly facing surfaces 82 of the depressions 80 tends to force the jig 60 upwardly thereby to cause the lure to rise in the water as it is retrieved.

It will be appreciated that the heads 20, 70 may be suitably coated and colored and may, if desired, have representations of eyes placed in the depressions 50, 80. The jig may form a component of various types of baits such as buzz baits, weight-forward spinner baits and blade-forward or in-line spinner baits.

I claim:

1. A fishing jig comprising ahead having front and rear ends, a hook having a shank secured to said head and extending rearwardly from the rear end of said head, said hook having a portion curving upwardly and forwardly from said shank, means on the front end of said head for attaching a fishing line to the head whereby the jig may be pulled forwardly through the water by the fishing line, said head having a generally hemispherical rear portion and having an elongated nose portion extending forwardly from said rear portion, said nose portion having a top, a bottom and two laterally facing sides, said top being defined by a rear-to-front extending top surface, said rear-to-front extending top surface sloping downwardly upon progressing forwardly, being centered laterally relative to said rear portion, being relatively wide adjacent said rear portion and being relatively narrow and adjacent the front end of said head, said bottom being defined by a rear-to-front extending bottom surface, said rear-to-front extending bottom surface being substantially straight adjacent said rear portion and then curving upwardly to the front end of said head, said rear-to-front extending bottom surface being centered laterally relative to said rear portion, being approximately the same width as said top adjacent the front end of said head and being wider than said top adjacent said rear portion, and each of said sides being defined by a generally spoon-shaped depression, each of said depressions being concavely cupped both rear-to-front and top-to-bottom adjacent said rear portion, said depressions being configured and located so as to cause said jig to tend to draw downwardly into the water as the jig is pulled forwardly through the water.

2. A fishing jig as defined in claim 1 in which each of said depression includes a concave bottom margin which curves sharply upwardly adjacent said rear portion so as to cause the depression to be formed with a laterally and upwardly facing surface.

3. A fishing jig comprising a head having front and rear ends, a hook having a shank secured to said head and extending rearwardly from the rear end of said head, said hook having a portion curving upwardly and forwardly from said shank, means on the front end of said head for attaching a fishing line to the head whereby the jig may be pulled forwardly through the water by the fishing line, said head having a generally hemispherical rear portion and having an elongated nose portion extending forwardly from said rear portion, said nose portion having a top, a bottom and two laterally facing sides, said top being defined by a rear-to-front extending top surface, said rear-to-front extending top surface sloping downwardly upon progressing forwardly, being centered laterally relative to said rear portion, being relatively wide adjacent said rear portion and being relatively narrow adjacent the front end of said head, said bottom being defined by a rear-to-front extending bottom surface, said rear-to-front extending bottom surface being substantially straight adjacent said rear portion and then curving upwardly to the front end of said head, said rear-to-front extending bottom surface being centered laterally relative to said rear portion, being approximately the same width as said top adjacent the front end of said head and being narrower than said top adjacent said rear portion, and each of said sides being defined by a generally spoon-shaped depression, each of said depressions being concavely cupped both rear-to-front and top-to-bottom adjacent said rear portion, said depressions being configured and located so as to cause said jig to tend to rise upwardly into the water as the jig is pulled forwardly through the water.

4. A fishing jig as defined in claim 3 in which each of said depressions includes a concave top margin which curves sharply downwardly adjacent said rear portion so as to cause said depression to be formed with a laterally and downwardly facing surface.

* * * * *